104423

PATENTED JUN 21 1870

Witnesses:
A. Bennewendorf
Alex F. Roberts

Inventor:
J. A. Casey
PER
Attorneys.

United States Patent Office.

JAMES A. CASEY, OF MAYSVILLE, KENTUCKY.

Letters Patent No. 104,423, dated June 21, 1870.

IMPROVEMENT IN SULKY-HARROWS, &c.

The Schedule referred to in these Letters Patent and making part of the same.

*To all whom it may concern:*

Be it known that I, JAMES A. CASEY, of Maysville, in the county of Mason and State of Kentucky, have invented a new and improved Sulky-Harrow, Cultivator, &c; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
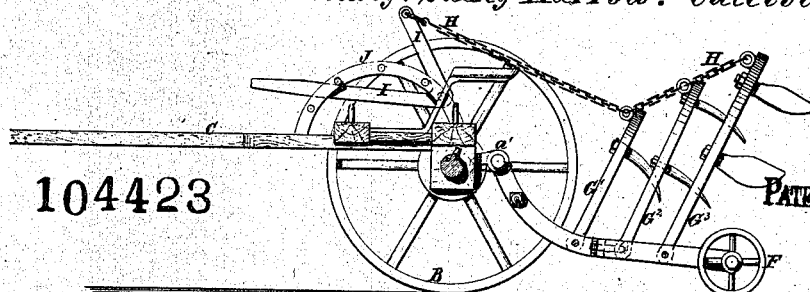
Figure 1 is a side view of my machine, adjusted as a cultivator, one of the sulky wheels being removed, and the cultivator-teeth being raised from the ground.
Figure 2:
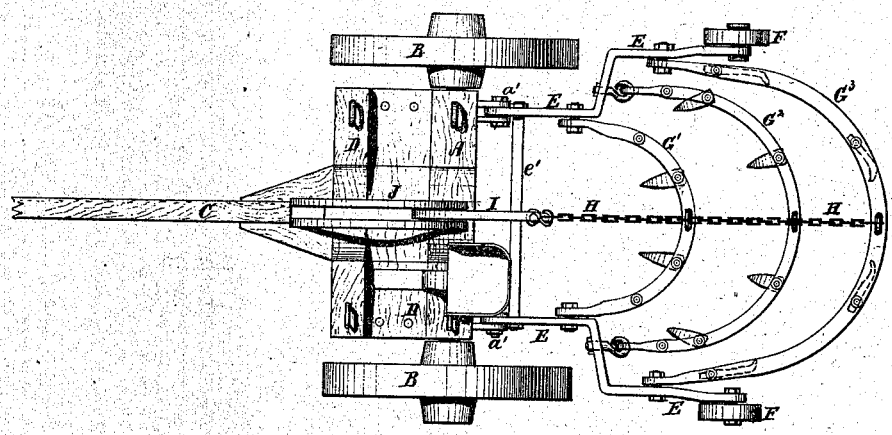
Figure 2 is a top view of the same.
Figure 3:
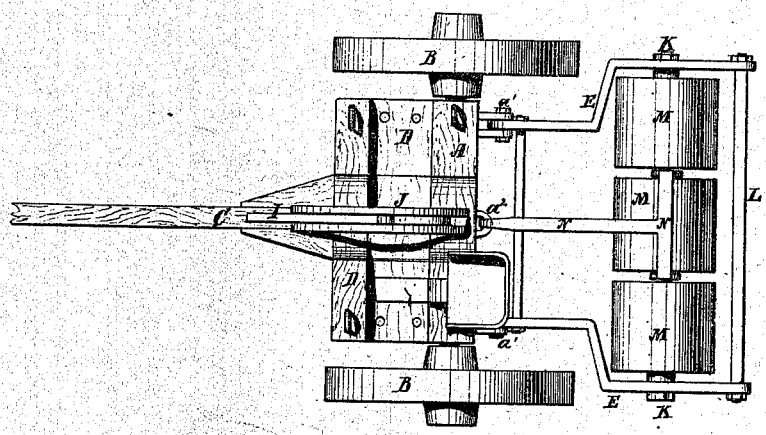
Figure 4:
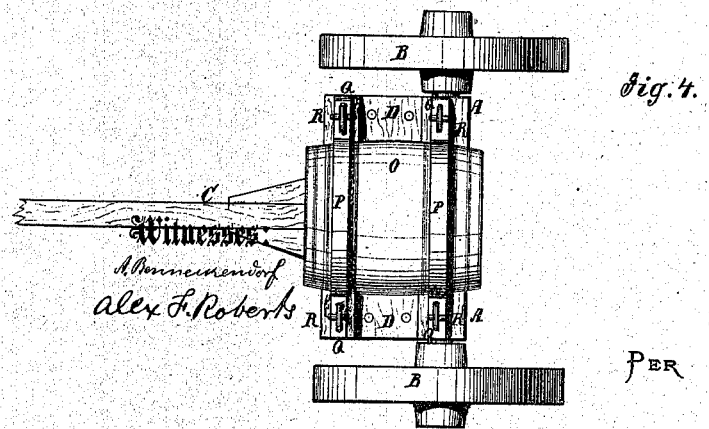

My invention has for its object to furnish an improved machine, which shall be so constructed that it may be readily adjusted for use as as a harrow and cultivator, doing its work well in either capacity; and It consists in the construction and combination of the various parts of the machine, as hereinafter more fully described.

A is the axle of the machine, upon the journals of which the sulky-wheels, B, revolve, and to which the tongue, C, is securely attached.

D is a frame-work, securely attached to the tongue C and axle A, for the attachment of various parts of the machine, as hereinafter more fully described.

To the axle A are secured two eye-bolts, $a'$, to the eyes of which are detachably pivoted the forward ends of the bars E, the forward parts of which are connected by a bar, $e'$, and to the rear ends of which are pivoted small wheels, F, which I prefer to make in the form of caster-wheels.

The bars E are made with an offset, to bring their rear parts about in line with the sulky-wheels B, and allow more room for the bows $G^1$ $G^2$ $G^3$, to which the cultivator and harrow-teeth are attached.

The bows $G^1$ $G^2$ $G^3$ are arranged the one in the rear of the others, and their ends are detachably pivoted to the bars E. When the machine is to be used as a cultivator, shovels, or cultivator-teeth, should be attached to the forward bows, $G^1$ $G^2$, but to the rear bow $G^3$ should be attached turn-shovels or teeth so formed as to throw the soil toward the row of plants being cultivated, and over which the machine passes, space being left between the teeth in the middle parts of the bows for the passage of the plants.

When the machine is to be used as a harrow, the cultivator-teeth are detached and replaced by the harrow-teeth, but, in this case, the teeth in the forward bow $G^1$, and the end teeth of the bow $G^2$, should be knives or cutters, to cut up the roots, to enable the harrow-teeth to properly stir up the ground.

All the different teeth pass up through holes in the bows $G^1$ $G^2$ $G^3$, and are secured by nuts screwed upon their upper ends.

To the upper side of the central parts of the bows $G^1$ $G^2$ $G^3$ is attached a chain, H, the forward end of which is secured to the end of the short arm of the bent lever I, which is pivoted at its angle in the slot of the curved guide-bar J, which has holes formed through it to receive the stop-pin, by which the bent lever is secured in place to hold the bows $G^1$ $G^2$ $G^3$ away from the ground, when passing from place to place. The lever I also enables the bows $G^1$ $G^2$ $G^3$ to be conveniently raised for passing obstructions.

Having thus described my invention,

I claim as new and desire to secure by Letters Patent—

1. The bars or frame E, wheels F, and detachable pivoted bows $G^1$ $G^2$ $G^3$, provided with harrow-teeth, cultivator-teeth, cutters or plows, in combination with the sulky A B C D, substantially as herein shown and described, and for the purpose set forth.

2. The combination of the chain H, bent lever I, and slotted guide-bar J, with the bows $G^1$ $G^2$ $G^3$, pivoted bars E, and sulky A B C D, substantially as herein shown and described, and for the purpose set forth.

The above specification of my invention signed by me this 2d day of October, 1869.

JAMES A. CASEY.

Witnesses:
 R. H. STANTON,
 E. C. PHISTER.